United States Patent [19]

Berzansky, Jr. et al.

[11] Patent Number: 5,562,862
[45] Date of Patent: *Oct. 8, 1996

[54] POLYBUTENE-BASED FOAM CONTROL COMPOSITION FOR AQUEOUS SYSTEMS

[75] Inventors: Charles J. Berzansky, Jr.; Duy T. Nguyen, both of Jacksonville, Fla.

[73] Assignee: Betz Laboratories, Inc., Trevose, Pa.

[*] Notice: The term of this patent shall not extend beyond the expiration date of Pat. No. 5,229,033.

[21] Appl. No.: 223,616

[22] Filed: Apr. 6, 1994

[51] Int. Cl.$^6$ .................................................. B01D 19/04
[52] U.S. Cl. .............................. 252/321; 252/358; 162/77
[58] Field of Search ...................................... 252/321, 358; 162/77

[56] References Cited

U.S. PATENT DOCUMENTS

| | | | |
|---|---|---|---|
| 3,705,859 | 12/1972 | Boylan | 252/321 |
| 3,959,175 | 5/1976 | Smith, Jr. et al. | 252/358 |
| 4,477,370 | 10/1984 | Kavchok et al. | 252/321 |
| 5,045,232 | 9/1991 | Dahanayake | 252/358 |
| 5,152,925 | 10/1992 | Furman | 252/358 |
| 5,229,033 | 7/1993 | Nguyen et al. | 252/358 |
| 5,283,002 | 2/1994 | Nguyen | 252/321 |
| 5,320,777 | 6/1994 | Nguyen et al. | 252/358 |

FOREIGN PATENT DOCUMENTS 0502603  9/1992  European Pat. Off. .

*Primary Examiner*—Richard D. Lovering
*Assistant Examiner*—Daniel S. Metzmaier
*Attorney, Agent, or Firm*—Alexander D. Ricci; Richard A. Paikoff

[57] ABSTRACT

A stable defoamer composition and method of defoaming an aqueous system is disclosed. The composition comprises an alcohol alkoxylate, at least one surfactant having a melting point less than 20° C., and a low HLB, ethylene oxide/propylene oxide block copolymer, said block copolymer carried in a mixture comprising polybutene.

10 Claims, 7 Drawing Sheets ns relates to foam control compositions, their preparation and use in aqueous media. Specifically, the invention relates to a defoamer composition particularly useful in controlling foam problems encountered in low to moderate temperature pulp and paper mill process water streams.

POLYBUTENE-BASED FOAM CONTROL COMPOSITION FOR AQUEOUS SYSTEMS

FIELD OF THE INVENTION

The present invention relates to foam control compositions, their preparation and use in aqueous media. Specifically, the invention relates to a defoamer composition particularly useful in controlling foam problems encountered in low to moderate temperature pulp and paper mill process water streams.

BACKGROUND OF THE INVENTION

The persistence of foam in various aqueous industrial operations may cause process inefficiency and, in some cases, an inferior final product. The pulp and paper industry experiences some of the most troublesome foam problems. Incessant foaming commonly occurs in pulp washing, screening and bleaching processes. Foam also may surface during effluent wastewater treatment.

Entrained air tends to be a more serious type of foam. The spherical entrained air bubbles are finely dispersed in the bulk solution. Small bubble volumes tend to lack a sufficient buoyant force, and thus often become attached to nonwettable fiber parts. These fibers and fines can flocculate to the surface and form dense stable foam. As a result, the stabilized bubbles may inhibit the drainage of washing liquor through the fiber mat which in turn slows down production. Entrained air is also known to impair paper formation and tensile strength.

Surface foam, on the other hand, is a more visible problem which can be evident in wire pits, stock chests and effluent ponds. The existence of surface foam indicates an entrained air problem. On the paper machine, collapsed surface foam may be carried back through the headbox and into the sheet where holes may be formed. On the deckers, mat filtration can be reduced when surface foam is picked up by the mat. Wastewater foaming may be hazardous to both the environment as well as man.

Foam may be controlled by a variety of chemical methods. An effective antifoam should be slightly insoluble, yet dispersable, in the foaming medium. The antifoam should be able to control both entrained air and surface foam over a prolonged period of time. The present invention was developed in order to prevent or control the above described foaming problems, while avoiding the creation of any undesirable side effects in the system or on the paper machines.

SUMMARY OF THE INVENTION

The defoamer/antifoam compositions of the present invention comprise a concentrate of active ingredients such as an ethoxylated/propoxylated fatty alcohol, a polyoxyethylene/poly oxypropylene ester, and a low HLB(1–4), high molecular weight EO-PO block copolymer carried in a polybutene and dialkyl phthalate mixture. This composition has been found to be superior in reducing and controlling both surface foam and entrained air versus other conventional defoamers. The benefits of the foaming effects are more evident at lower temperatures, especially systems operating in the 20° C.–55° C. range such as various process effluent streams and alkaline paper machines.

Many conventional foam control compositions embody fatty acid or fatty alcohol-based particulate emulsions to achieve a degree of water insolubility and hence defoaming effects. Compositions as such comprise a hydrophobic dispersion of, e.g., solid fatty alcohol of 14–28 carbon atoms, thus requiring the process steps of heating the material to at least 60° C., followed by cooling to ambient temperatures. (See U.S. Pat. No. 4,477,370). The result is an efficacious product but containing defoaming particulates which are prone to undesirable deposition throughout the papermaking process. Due to the relatively low percent actives of these composition types, the costs of transportation, storage and use tend to be uneconomical.

An additional class of particulate defoamer agents encompasses the use of hydrocarbon oils, silicone oils, high melting point amides, paraffinic waxes, and hydrophobic silicas. It is noted that the presence of such high melt point surfactants and silica particulates is critical for the primary functionality of said products. Defoaming effects can be achieved at the expense of impacting paper sheet properties and causing felt and machine deposition. The Dahanayake Patent, U.S. Pat. No. 5,045,232, necessitates the use of a hydrophobic silica and propoxylated/ethoxylated $C_6$ to $C_{10}$ and $C_{12}$ to $C_{14}$ alkanols to provide a static foam collapse.

The present invention achieves superior defoaming effects while addressing the negative effects caused by the previously mentioned antifoams. The present invention is an improvement over U.S. Pat. No. 3,959,175 (Smith et al) and U.S. Pat. No. 5,229,033 (Nguyen et al) containing polybutene. This will become apparent as described in the examples below. The use of alkoxylated long chain $C_{14}$–$C_{16}$ and $C_{16}$–$C_{18}$ alkanols over the chain lengths ($C_6$–$C_{10}$ and $C_{12}$–$C_{14}$) used in the '232 patent provides a greater degree of insolubility and therefore an improvement in defoaming aqueous systems.

The present invention is formulated as a water dilutable concentrate of ingredients that requires no time consuming manufacturing steps such as heating and cooling, but only a simple blending procedure. The composition will not deposit on felts or machines nor cause adverse effects on paper sheet properties as could occur with silicone oils, high melt point particulates, and silicas.

DETAILED DESCRIPTION OF THE INVENTION

Figure 1:
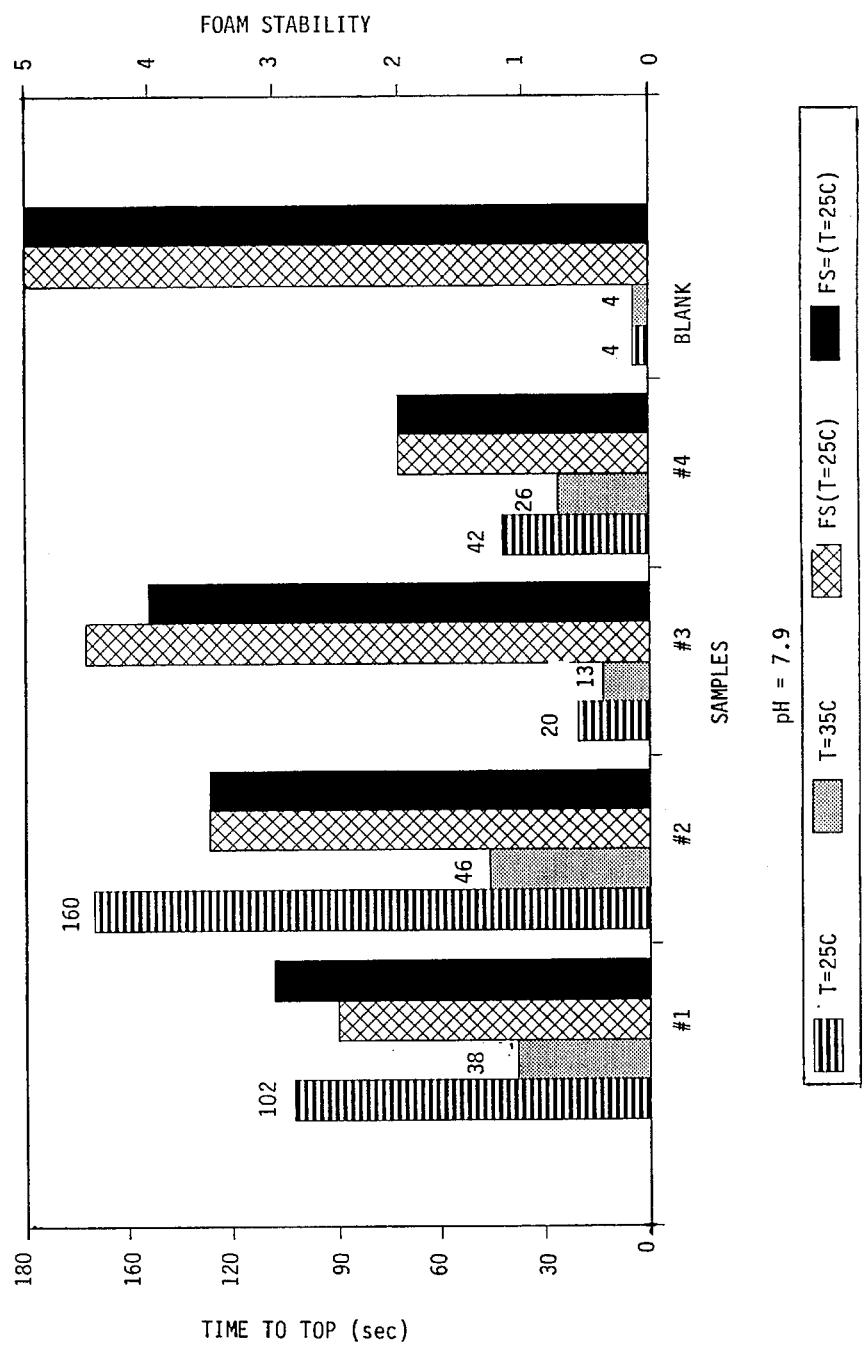
FIG. 1 illustrates the toptime and foam stability of EO/PO fatty alcohols in synthetic effluent.

A significant improvement in the control of foaming in papermaking processes can be accomplished by the use of a foam control composition which is the subject of the present invention. The primary focus of this composition is the role of polybutene when combined with the EO/PO fatty alcohol and the EO/PO block copolymer as a significant enhancer of the defoaming effect. The number average molecular weight of the polybutene may vary from about 300–3,000. Although the efficacies for different molecular weights of polybutene are comparable, a polybutene of molecular weight below about 400 is preferable since a translucent, low viscosity, stable solution is formed when combined with a nonionic surfactant and diisooctyl phthalate.

It has been discovered that polybutene alone provides some defoaming effects, but when combined with the surfactants of this composition, the efficacy is considerably enhanced. A synergistic interaction has been found since the efficacy of the polybutene/surfactant combination is an improvement over the individual components, as well as the polybutene/surfactant combinations of the prior art. The presence of polybutene lowers the surface tension by 4–6 dynes/cm which in turn increases the spreadability of the antifoam at the air/liquid interface.

The fatty alcohol ethoxylate/propoxylate may have a cloud point of at least 16° C., preferably 22° C.–25° C., and may have a molecular weight of from about 1,200–3,000. The fatty alcohol ethoxylate/propoxylate has a chemical structure represented by the following formula:

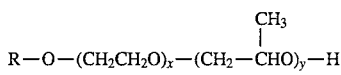

where R is linear or branched chain alkyl having from about 12 to 18 carbon atoms (preferably a $C_{14}$–$C_{16}$ mixture); x from about 2–20 and y from about 0–15.

The surfactants having a melting point less than 20° C. and may include but are not limited to polyethylene glycol esters, sorbitan esters, polyoxyethylene/polyoxypropylene oleic acid and polyoxyethylene/polyoxypropylene dioleic acid. A preferred polyethylene glycol surfactant is a PEG 400 dioleate or PEG 600 dioleate, available as MAPEG 400®(DO). Characteristic examples are available from PPG Industries, Inc. as PEG 200 dioleate (DO), PEG 400 dioleate (DO), and PEG 600 dioleate (DO). The polyoxyethylene/polyoxypropylene ester may be derived from polyoxyethylene/polyoxypropylene oleic acid which has the following structure:

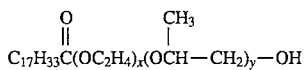

or, polyoxyethylene/polyoxypropylene dioleic acid which has the following structure:

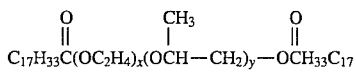

wherein x can be from about 1 to 10 and y can be from about 0 to 35 moles.

The low HLB block copolymer consists of one of the following structures:

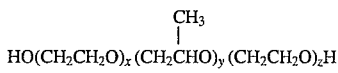

where $2 \leq x+z \leq 9$, $x,z \neq 0$, $36 \leq y \leq 90$
or:

where $14 \leq a+c \leq 25$, $a,c \neq 0$, $4 \leq b \leq 8$.

The numbers defining the amounts of the repeat units represent the number of moles. Preferably, the x+z content is from about 4–6 moles, y is from about 5–7 moles, the a+c content is from about 20–25 moles and b is from about 5–7 moles. The average molecular weight of the block copolymer is preferably in the range of from about 2,000–6,000, most preferably from about 3,500–5,000. It should have a low HLB, preferably in the range of from about 1–4, most preferably 1–3 and a cloud point preferably lower than 30° C., most preferably in the range of from about 14° C.–25° C.

Block copolymers are commercially available from BASF under the PLURONIC® Series.

The addition of an ester of 1,2-benzenedicarboxylic acid, especially 1,2-benzenedicarboxylic acid diisooctyl ester (diisooctyl phthalate) or 1,2-benzenedicarboxylic acid ditridecyl ester (ditridecyl phthalate) aids in rapidly carrying the surfactant to the air-liquid interface for defoaming action. The diisooctyl phthalate also serves as a co-solvent to stabilize and make the product translucent.

The present invention may be formulated at room temperature with no heating and cooling required. The blending of the polybutene with the EO-PO block copolymer results in a cloudy solution, indicating a degree of incompatibility. The mixture is titrated with diisooctyl phthalate under agitation until the blend becomes translucent. The remaining ingredients: EO/PO fatty alcohol and polyethylene glycol ester, are added and blended until the mixture is homogeneous. The composition remains clear and stable at temperatures ranging from about 5° C.–50° C. for several months. The addition of a small amount of polyethylene glycol ester aids in the makedown and increases the efficacy of the product. If desired, the mixture may be diluted to about 10%–15% with water. The latter emulsion is thin, flowable and stable for the purpose of short-term diluted product storage. The water dilutability of this product is an advantage over the prior art.

The relative amounts of the individual components of the present invention are as follows (values are in weight percent):

| Component | Suitable | Preferred |
|---|---|---|
| Ethoxylated/Propoxylated fatty alcohol | 20%–90% ($C_{12}$–$C_{18}$ mixture) | 45%–70% ($C_{14}$–$C_{16}$ mixture) |
| Polybutene | 3%–25% | 5%–15% |
| Ester of 1,2-benzenedicarboxylic acid | 3%–25% | 5%–15% |
| Polyethylene glycol ester(s) | 3%–25% | 5%–15% |
| Block copolymer | 1%–20% | 3%–12% |

The amount of the composition of the present invention which is needed to facilitate the defoaming function depends upon the degree of active ingredients of the chemical components present and the severity of the foaming system. The amount of the antifoam/defoamer composition added to the foaming system is an amount which will establish a concentration of about 1.0 to about 500 ppm, based on volume. The preferable concentration range is between about 10 ppm and 100 ppm. The composition of the present invention may be added either continuously or intermittently directly to the white water drainage tank or at any other location in the papermaking process where foaming occurs.

EXAMPLES

In order to illustrate the efficacy of the present invention, a variety of pulp and paper processing waters were used as foaming media. The antifoams of the present invention may be used in aqueous paper processing foaming systems where temperatures range from about 20° C.–55° C., including, but not limited to, pulp and paper mill effluent and paper machine white water.

In evaluating the antifoam efficacy, the medium is continuously circulated from a calibrated reservoir (0–295 cm) via a pump, and is returned back to the reservoir. This action agitates the medium, which in turn causes foam. The test cell is filled with the medium at the desired operating temperature. The medium temperature may be held approximately constant with a temperature controller and heat coil wrapped around the bottom cell reservoir. A pump and stopwatch are started simultaneously, and a known amount of the subject antifoam is introduced into the test cell outlet stream. The foam drops to a minimum level and this level is recorded as the initial foam drop level. The foam levels are then recorded every 30 seconds, until the foam reaches the maximum level. At this point, the pump is turned off and the regulating nozzle outlet is closed to prohibit the flow of the testing medium. The test time is recorded as the time to top and the stability of the column of foam within 30 seconds is ranked on a scale of 1–5, with 1 being very unstable and 5 being very stable. Ideally, the more desirable efficacious anti-foam should possess a higher time to top and a foam stability (FS) of 1.

EXAMPLE 1

The following ethoxylated/propoxylated fatty alcohols were tested as 100% active for efficacy. In these samples, the weight of propylene oxide units is 77%, while ethylene oxide units is 13% (only the fatty chain length mixtures vary).

| Sample 1 | EPAL ® (Ethyl Corp.) 1416+EO+PO |
| Sample 2 | EPAL 1618+EO+PO |
| Sample 3 | EPAL 1012+EO+PO |
| Sample 4 | EPAL 1214+EO+PO |

Using the antifoam recirculation tester and method described above, the samples were tested in a synthetic effluent formulation (average pulp/paper mill effluent water). This medium was prepared with the following ingredients (percentage by weight):

| Deionized water | 99.38% |
| $CaCl_2.2H_2O$ | 0.01% |
| NaCl | 0.04% |
| $MgSO_4$ | 0.01% |
| $Na_2SO_4$ | 0.03% |
| $Na_2SiO_3.5H_2O$ | 0.01% |
| Rosin | 0.02% |
| Alum | 0.02% |
| Starch | 0.30% |
| Black liquor | 0.20% |

(pH is adjusted to about 7.8–8.0 with 4 N $H_2SO_4$).

FIG. 1 displays the results of the efficacy testing of the above samples. Samples 1 and 2 possess better time to top and hold-down readings, while sample 4 provides the most unstable foam but an insufficient hold-down time. Both the time to top and foam stability of sample 1 support the choice of the EPAL 1416+EO+PO as a preferential raw material of this type. The following antifoams were tested in several types of foaming media. Defoaming Compositions 6–10 were prepared as simple blends at room temperature.

| Defoaming Composition 1 | 100% Epal 1416+EO/PO |
| Defoaming Composition 2 | 100% Mapeg 400 DO ester |
| Defoaming Composition 3 | 100% Pluronic ® L 121 |
| Defoaming Composition 4 | 100% Diisooctyl Phthalate |
| Defoaming Composition 5 | 100% Polybutene |
| Defoaming Composition 6 | 65% Epal 1416+EO/PO; |
|  | 5% Pluronic L 121; |
|  | 30% Polybutene |
| Defoaming Composition 7 | 65% Epal 1416+EO/PO; |
|  | 5% Pluronic L 121; |
|  | 30% Diisooctyl Phthalate |
| Defoaming Composition 8 | 68% Epal 1416+EO/PO; |
|  | 5% Pluronic L 121; |
|  | 12% Diisooctyl Phthalate; |
|  | 15% Polybutene |
| Defoaming Composition 9 | 62% Epal 1416+EO/PO; |
|  | 5% Pluronic L 121; |
|  | 10% Diisooctyl Phthalate; |
|  | 13% Polybutene |
|  | 10% PEG 400 DO ester |
| Defoaming Composition 10 | 50% PEG 600 DO ester; |
| (From U.S. Pat. No. 5,229,033) | 40% Polybutene L-14; |
|  | 10% PEG 400 DO ester |
| Defoaming Composition 11 | Fatty alcohol emulsion (13% actives) |
| Defoaming Composition 12 | 10% Defoaming Composition 9 - Diluted with deionized water |

EXAMPLE 2

Defoaming Compositions 1–9 were evaluated in synthetic paper mill effluent using the recirculation test cell. Operating conditions of 30° C. and a pH of 7.9 were used for this testing.

Figure 2:
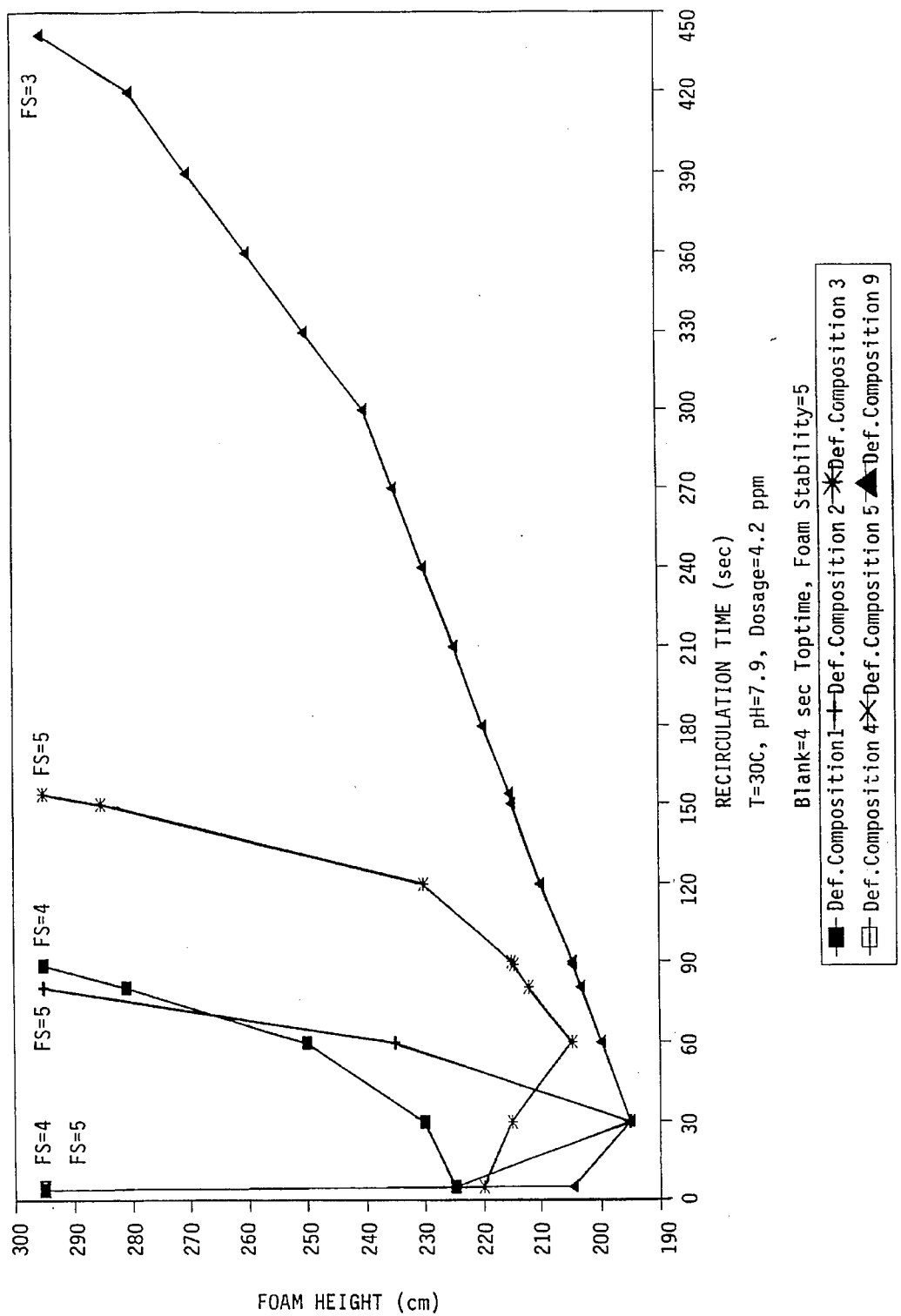
FIGS. 2–5 demonstrate foam height vs. recirculation time in synthetic papermill effluent.

The foam cell test data from FIG. 2 indicates that the antifoam of the present invention (Composition 9) exhibits improved foam control as compared to each individual component. Composition 9 not only provides better hold-down but also effects sufficient foam instability in a severely foaming effluent.

EXAMPLE 3

Defoaming Compositions 6–9 were evaluated in a simple shake test. 70 grams of the synthetic effluent were introduced into an 8 oz. jar for each sample, along with blank. The jars were shaken for one minute in order to develop an initial foam head of approximately 30 mm. Each sample was dosed with 5 ppm of defoaming composition. The samples were shaken for an additional minute and foam heights were recorded and evaluated after 10 seconds.

|  | Foam height (mm) after 10 sec. |
| --- | --- |
| Defoaming Composition 6 | 2 |
| Defoaming Composition 7 | 5 |
| Defoaming Composition 8 | 3 |
| Defoaming Composition 9 | 0 |
| Blank | 30 |

Figure 3:
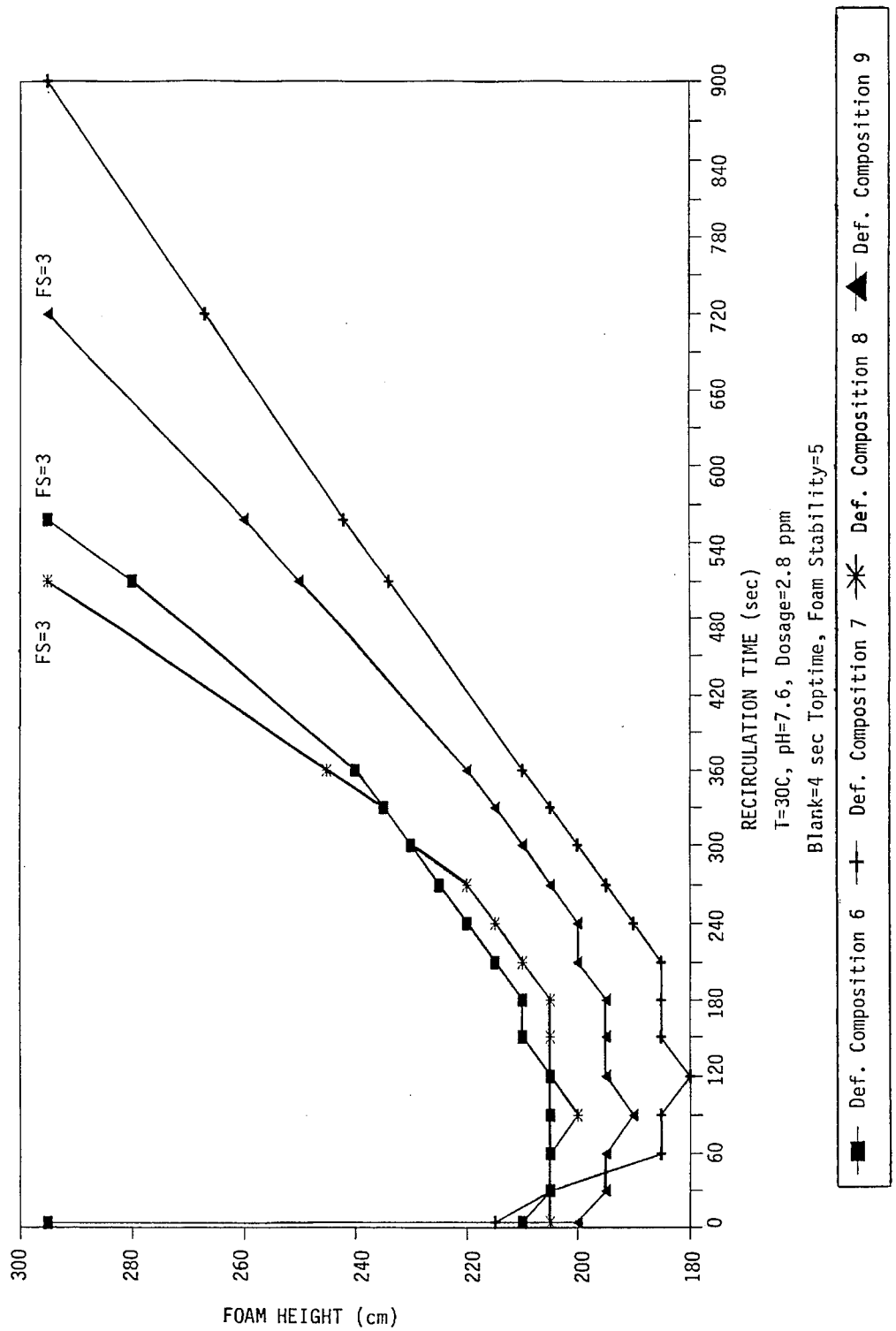

Based upon these results, Defoaming Compositions 6 through 9 were evaluated in the antifoam recirculation test cell. In FIG. 3 all samples displayed very long recirculation times. The most desirable efficacies were those displaying top times above 600 seconds. Table 1 lists each sample's top times, including a 10 percent error. It is evident that Defoaming Composition 9 possessed both desired foam instability and high top time. Defoaming Composition 7 provided a superior top time, but the initial foam drop level within 5 seconds was not as low as the level of Defoaming Composition 9. This initial foam drop level seems to correlate somewhat with the foam height levels observed in the shake tests. The test cell foam stability numbers observed for these samples were all 3. Therefore, the shake test results were referred to in order to ascertain differences in foam stabilities. Defoaming Composition 9 displayed no foam head in shake tests, and the lowest initial foam level within 5 seconds of the start of the recirculation test (see Table 1). The absence of polybutene (Defoaming Composition 7) causes a higher foam height and, as observed, undesirable small finely dispersed air bubbles in solution and in the foam head.

TABLE 1

| Sample | Initial Foam Level (at 5 sec.) | Final Foam Level/Time |
|---|---|---|
| Defoaming Composition 6 | 210 (6 sec.) | 295 cm at 558 ± 56 sec. |
| Defoaming Composition 7 | 215 | 295 cm at 900 ± 90 sec. |
| Defoaming Composition 8 | 205 | 295 cm at 510 ± 51 sec. |
| Defoaming Composition 9 | 200 | 295 cm at 720 ± 72 sec. |

EXAMPLE 4

Figure 4:
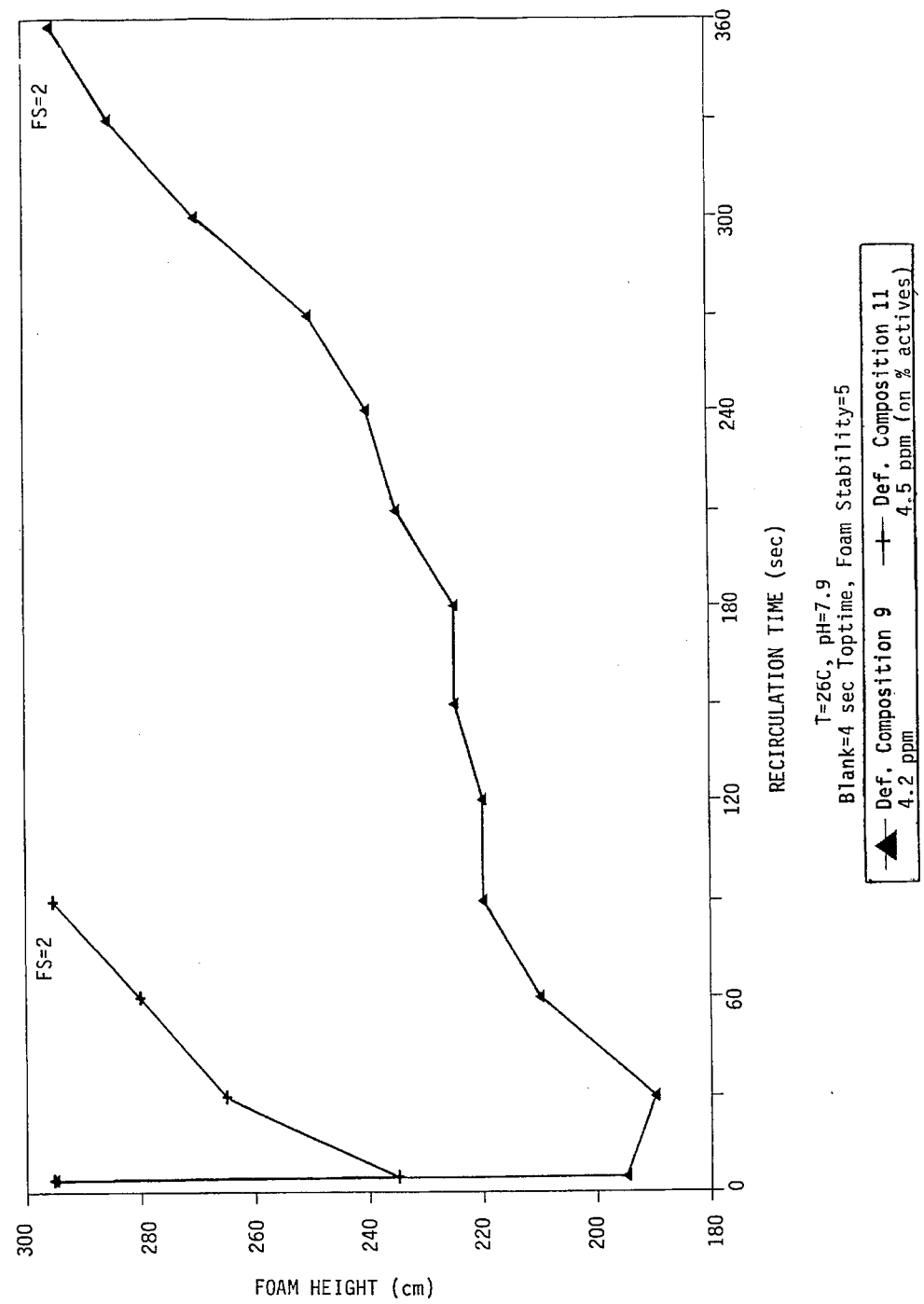
Figure 5:
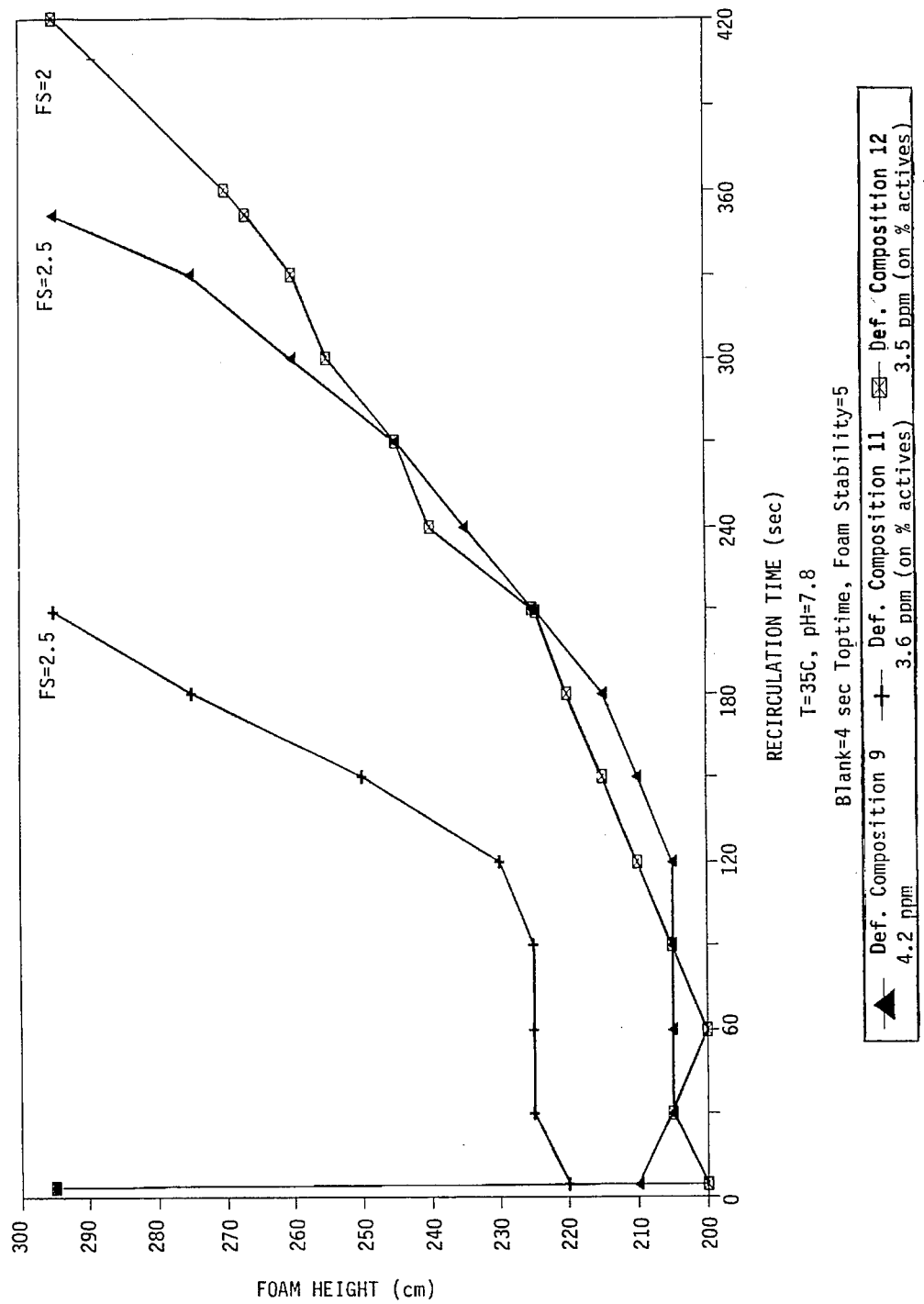

Synthetic paper mill effluent was used to screen the antifoam of the present invention versus a conventional fatty alcohol emulsion. Although static foam instabilities were similar for both Defoaming Compositions 9 and 11, Defoaming Composition 9 is clearly efficacious with regard to time to top (see FIGS. 4 and 5). Defoaming Composition 12 (a 10% emulsion of Defoaming Composition 9) also performs equally as well, if not slightly better, than Defoaming Composition 9.

EXAMPLE 5

Synthetic alkaline fine paper white water was used as the foaming medium. This medium was prepared with the following ingredients (percentage by weight):

| Deionized water | 98.34% |
| $CaCO_3$ | 0.30% |
| $Al_2(SO_4)_3 \cdot 13H_2O$ | 0.01% |
| Rosin | 0.01% |
| NaCl | 0.01% |
| $MgSO_4$ | 0.002% |
| $Na_2SO_4$ | 0.09% |
| $Na_2SiO_3 \cdot 5H_2O$ | 0.01% |
| $CaCl_2 \cdot 2H_2O$ | 0.01% |
| Microcrystalline cellulose | 0.79% |
| 37% formaldehyde | 0.03% |
| AKD - alkyl ketene dimer | 0.01% |
| 5% starch solution | 0.40% |

(pH is adjusted to about 7.3–7.8 with 4 N $H_2SO_4$).

Figure 6:
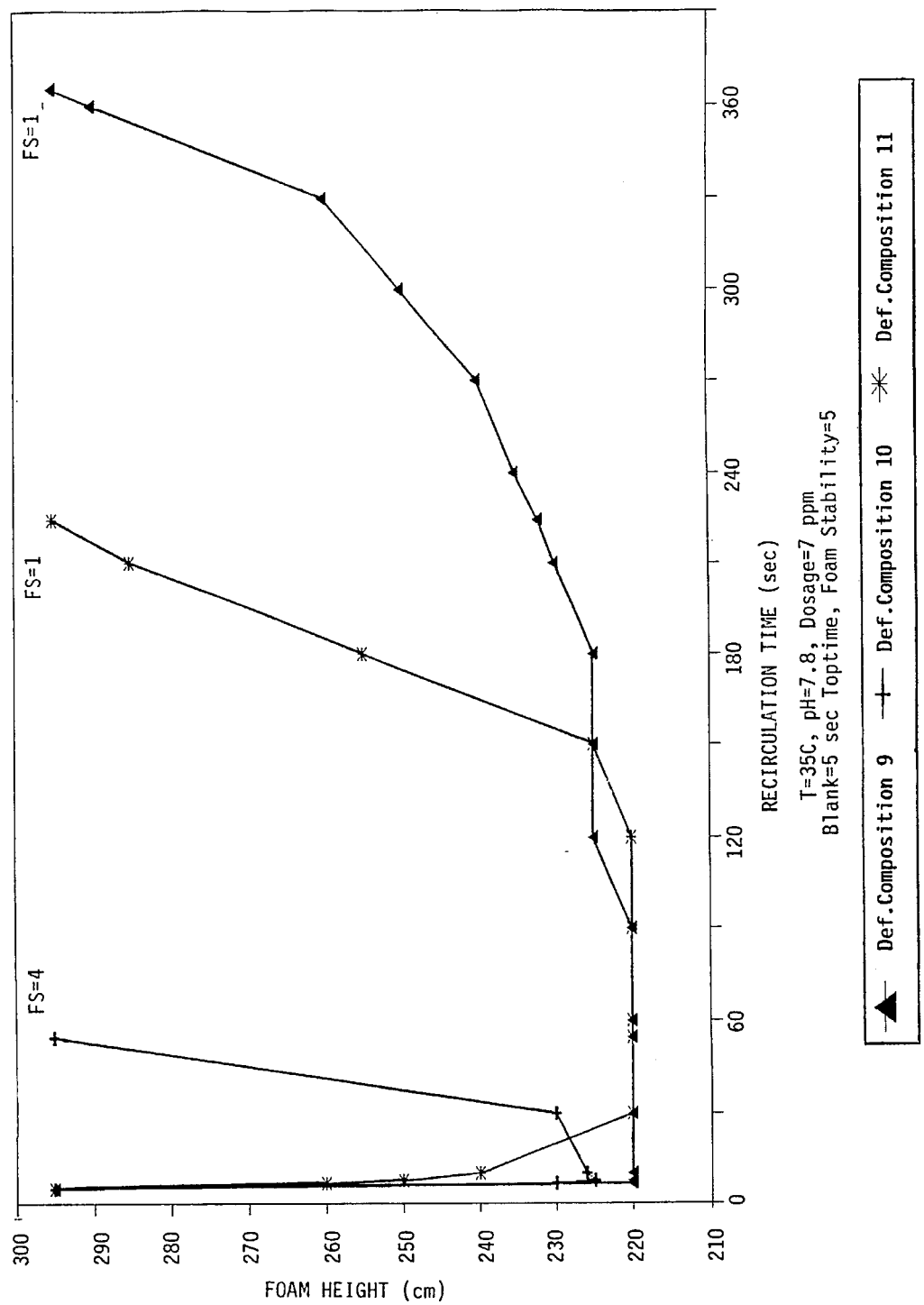
FIGS. 6–7 illustrate foam height vs. recirculation time in synthetic alkaline papermill whitewater.
Figure 7:
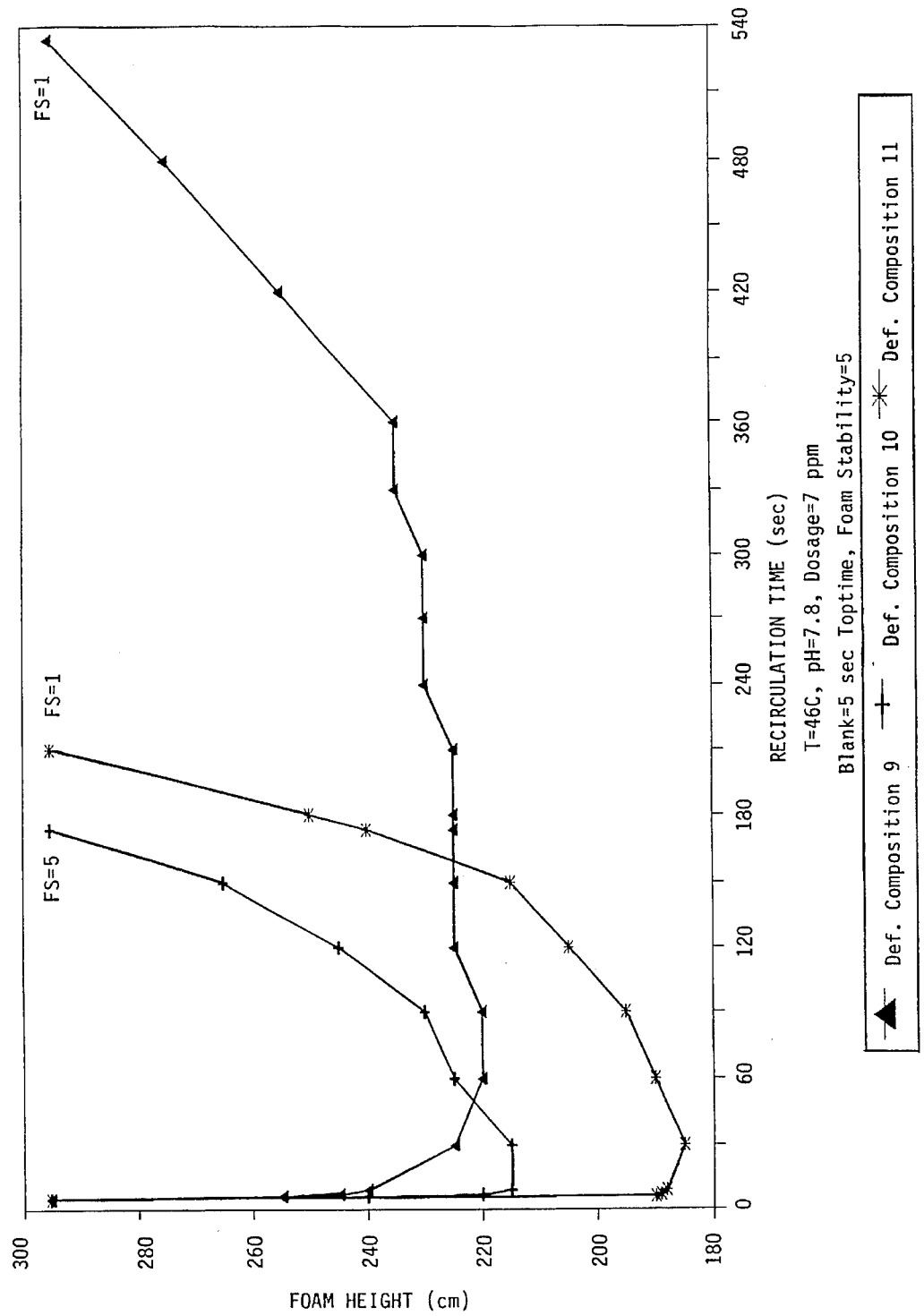

The test procedure is as defined above. FIGS. 6 and 7 display the results for foam cell tests conducted at 35° C. and 46° C., respectively, at a pH of 7.8. The data illustrates that Defoaming Composition 9 exhibits extremely improved foam control over Defoaming Composition 10 in both foam stability and time to top. The addition of polybutene, EO/PO fatty alcohol, block copolymer and diisooctyl phthalate effects a marked improvement in foam instability and holddown time. The prior art defoamer (Defoaming Composition 11) fails to provide a sustained foam suppression as compared to the antifoam of the present invention.

While this invention has been described with respect to particular embodiments thereof, it is apparent that numerous other forms and modifications of the invention will be obvious to those skilled in the art. The appended claims and this invention generally should be construed to cover all such obvious forms and modifications which are within the true spirit and scope of the present invention.

We claim:

1. A stable defoamer composition consisting essentially of a) from about 20–90%, by weight, of a fatty alcohol ethoxylate/propoxylate, b) from about 3–25%, by weight, of at least one surfactant having a melting point less than 20° C., said surfactant selected from the group consisting of polyethylene glycol ester, sorbitan ester and polyoxyethylene/polyoxypropylene ester, c) from about 1–20%, by weight, of an ethylene oxide/propylene oxide block copolymer with an HLB of from about 1–4, and d) from about 3–25%, by weight of a dialky phthalate, said composition carried in about 3–25%, by weight, of polybutene.

2. The composition as recited in claim 1 wherein the number average molecular weight of said polybutene is from about 300–3,000.

3. The composition as recited in claim 1 wherein the number average molecular weight of said polybutene is from about 300–400.

4. The composition as recited in claim 1 wherein said dialkyl phthalate is a diisooctyl phthalate.

5. The composition as recited in claim 1 wherein the fatty alcohol ethoxylate/propoxylate is of the structure:

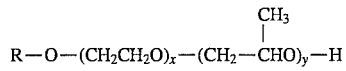

where R is a linear or branched chain alkyl having from about 12–18 carbon atoms, x is from about 2–20 and y is from about 0–15.

6. The composition as recited in claim 1 wherein the ethylene oxide/propylene oxide block copolymer is of the structure:

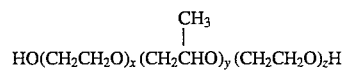

wherein x and z are each independently 1 or greater, and y is from about 36–90.

7. The composition as recited in claim 1 wherein the ethylene oxide/propylene oxide block copolymer is of the structure:

wherein a and c are each independently 1 or greater, and b is from about 4–8.

8. The composition as recited in claim 1 further consisting essentially of water.

9. A method of defoaming an aqueous system comprising adding to said system a composition consisting essentially of a) from about 20–9% by weight, of a fatty alcohol ethoxylate/propoxylate, b) from about 3–25%, by weight, of at least one surfactant having a melting point less than 20° C., said surfactant selected from the group consisting of polyethylene glycol ester, sorbitan ester and polyoxyethylene/polyoxypropylene ester, c) from about 1–20% by weight, of an ethylene oxide propylene oxide block copolymer with an HLB of from about 1–4, and d) from about 3–25% by weight of a dialkyl phthalate said composition carried in about 3–25% by weight, of polybutene.

10. The method as recited in claim 9 wherein said aqueous system is a papermaking system.

* * * * *